Dec. 9, 1958 R. G. ALTHERR 2,863,657
TORSION SPRING SUSPENSION
Filed April 5, 1955 2 Sheets-Sheet 1
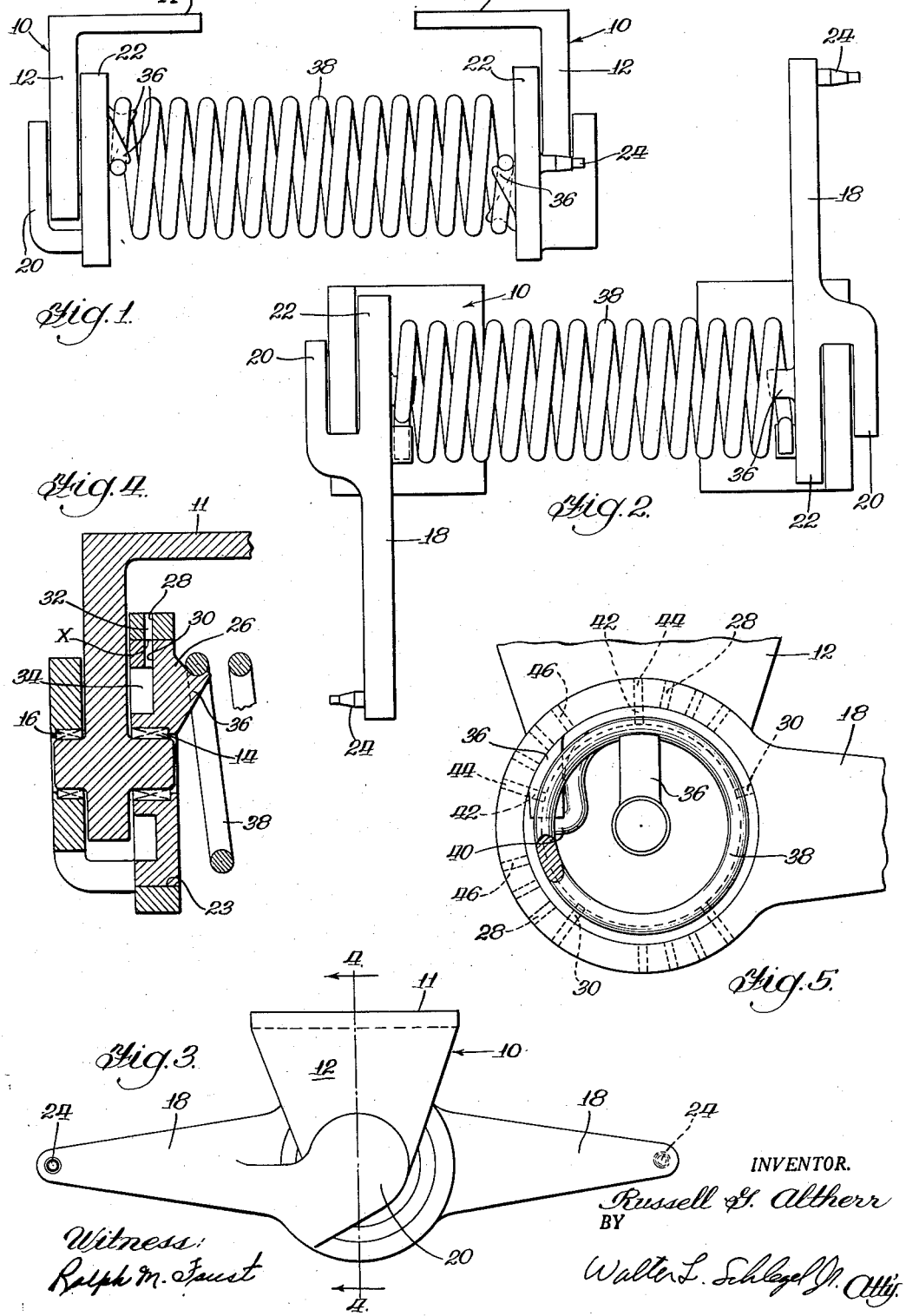
INVENTOR.
Russell G. Altherr
BY
Walter L. Schlegel Jr. Atty.
Witness:
Ralph M. Faust Dec. 9, 1958  R. G. ALTHERR  2,863,657
TORSION SPRING SUSPENSION
Filed April 5, 1955  2 Sheets-Sheet 2
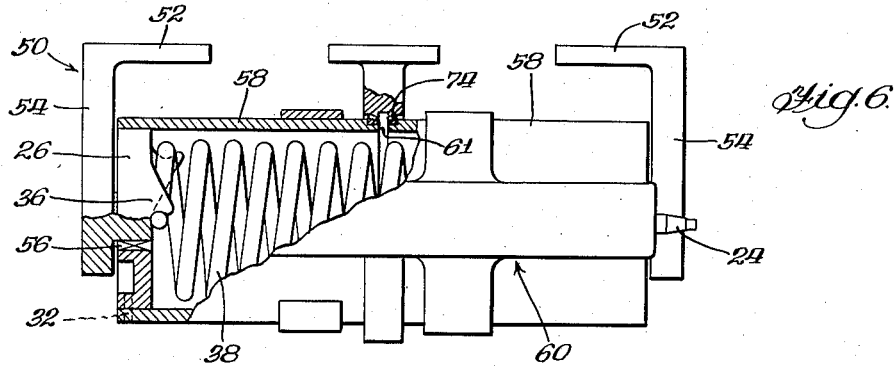
Fig. 6.
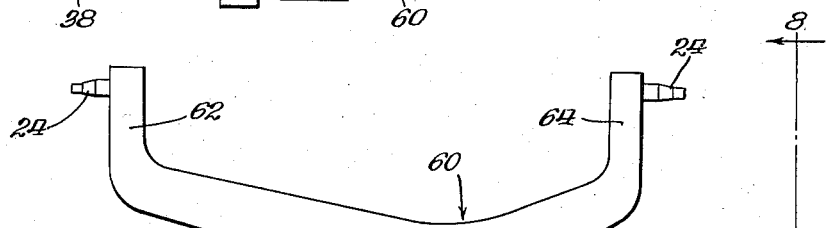
Fig. 7.
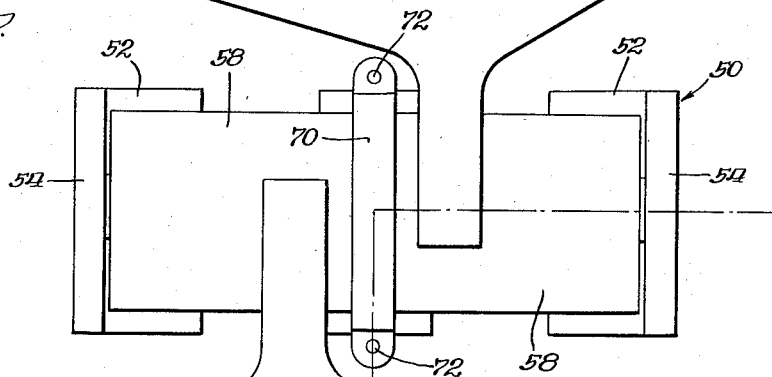
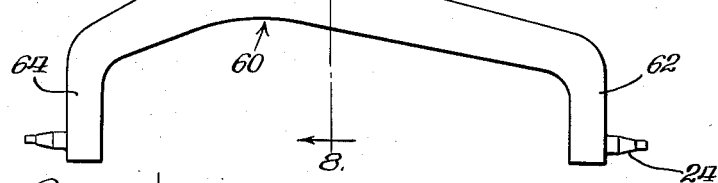
Fig. 8.
Witness:
Ralph M. Faust
INVENTOR.
Russell G. Altherr
BY
Walter L. Schlegel Jr. Atty

United States Patent Office 2,863,657
Patented Dec. 9, 1958

2,863,657

TORSION SPRING SUSPENSION

Russell G. Altherr, Hazelcrest, Ill., assignor to American Steel Foundries, Chicago, Ill., a corporation of New Jersey Application April 5, 1955, Serial No. 499,365

19 Claims. (Cl. 267—58)

This invention relates to vehicle suspensions, and more particularly to a torsion spring suspension for vehicles, including those of the track type such as army tanks, earth moving equipment and the like.

In the past single arm suspensions have been used for various types of vehicles wherein the torque reaction produced in the suspension caused undesirable effects on the vehicle frame. A second disadvantage of suspension devices of this type, wherein a torsion spring was utilized, has been the difficulty of providing torque adjustment means for the torsion spring. It is an object of this invention to provide a spring suspension device wherein the torque is self-contained so that only vertical motion is transmitted into the body of the vehicle.

Another object of the invention is to provide a torsion spring suspension having arms wherein equalization between the arms is obtained in that the load and action on one wheel are transmitted to the other wheel through equalization in the unit itself.

Still another object of the invention is to provide a novel means of attachment for a crank arm which incorporates provision for a spring mounting unit, and which is inexpensive to fabricate and easy to assemble and maintain.

It is also an object of this invention to provide novel adjustment means whereby the desired torsional resistance in the suspension, which may vary due to loads on the vehicle or unusual road conditions, may be easily and quickly attained.

Other objects and advantages will become apparent from the following specification and from the drawings, in which:

Figure 1 is a front elevational view of one embodiment of the device;

Figure 2 is a bottom view of the device of Figure 1;

Figure 3 is a side elevational view of the embodiment shown in Figure 1;

Figure 4 is a section taken at the lines 4—4 of Figure 3;

Figure 5 is a fragmentary view showing more clearly the arm attachment means and the preferred relationship of the spring supporting legs;

Figure 6 is a front elevational view of another embodiment of the invention, with certain parts broken away for clarity;

Figure 7 is a bottom view of the device shown in Figure 6;

Figure 8 is a section taken at line 8—8 of Figure 7.

Referring to the drawings and particularly Figures 1 through 5, the device comprises a pair of support brackets, indicated generally at 10, having a horizontally disposed vehicle supporting surface 11 and a depending arm or flange 12. The depending arm may be welded or cast integrally with the upper portion, or may be made separately and attached thereto by conventional means. Projecting inboardly and outboardly of the arms are axially aligned journal bearings 14 and 16, respectively. A crank arm 18 having a wheel mounting spindle 24 is provided for each bracket. The end of each arm opposite the spindle is preferably made in the form of a clevis having an outward arm 20 and an inward arm 22. The outward arm of the clevis is pivotally mounted on the outboard journal bearing of the depending arm, and the inward arm is provided with an opening 23 which is concentric and radially aligned with the inboard bearing 14. This structure is best seen in Figure 4.

The crank arms extend in opposite directions from each other and are disposed in approximately a horizontal position, though with no load on the vehicle they might be disposed at a slight angle to the horizontal without affecting the operation of the device. Pivotally mounted on each inboard bearing means 14, and received within the opening 23 of the inward clevis arm is a spring supporting clip 26. These spring clips, though free to rotate relative to the support bracket, are adjustably secured to the crank arm in a manner best illustrated in Figures 4 and 5.

Referring specifically to Figure 5, it is seen that the inward arm of the clevis portion of the crank arm is provided with a plurality of radial openings 28. In the same radial plane with the openings 28, and passing through the peripheral portion of the spring clip 26 are a plurality of holes 30. The openings in the crank arm and the spring clip are spaced in such a manner that preferably more than one of the openings in the clip will be simultaneously aligned with certain of the openings in the crank arm. However, the device will function even though one pair of holes is aligned at any particular time. A plurality of pins 32 of the same number as the number of aligned pairs of openings are provided, which are inserted through the aligned openings to lock the clip in place and to hold it in the same angular position relative to the crank arm. The purpose of these openings will be more fully explained hereinafter. In order that the pins may be readily removed when desired, an annular opening 34 is provided in the spring clip, with the opening 34 communicating with the openings 30, as best seen in Figure 4. When it is desired to remove a pin, which is preferably of a split roll pin type, the pin is merely driven downward through the arm and the clip, and ejected through the opening 34. Preferably integral with the spring clips and extending inboardly thereof are a pair of abutments 36, which are preferably annularly spaced at approximately 90 degrees. The purpose of these clip extensions is to engage and support the end coils of a helical torsion spring 38, which is disposed between and bridges the spring clips, as best seen in Figures 1 and 2. The extreme end portion of each terminal coil is preferably bent outward at right angles to the axle of the spring as at 40, and this bent-over portion engages one of the lugs 36. The terminal coil is supported on its inward side by the second projection 36 at approximately ¼ turn from the extreme end of the spring.

It is readily apparent that when a load is applied to the vehicle, the crank arms will be urged to pivot upwardly and in opposite directions, and that this pivotal movement will be restrained by the torsion spring 38. It should also be noted that the forces acting on the wheel are transmitted through the associated crank arm, through the spring clip, through the torsion spring, and thence into the other clip, crank arm and wheel. All of the torsional forces are thereby completely self-contained in the suspension unit and only vertical motion will be transmitted through the support bracket into the vehicle itself.

Referring again to the adjustment portion of the device, illustrated in Figures 4 and 5, it is seen that certain of the openings in the spring clip are aligned with certain openings in the crank arm. For example, the openings, designated 42 in the spring clip are aligned with openings 44 in the arm. It may be desirable for various reasons as, for example, to accommodate an increased vehicle load, to increase the amount of torsional prestress in the helical spring 38. This adjustment can be made by moving the spring clip, which is engaging the terminal coils of the spring, angularly relative to the crank arm. For example, an adjustment might be made by first removing the pins from the aligned holes 42 and 44, and rotating the spring clip so that the openings 42 in the clip will be aligned with a different pair of openings such as openings 46 in the crank arm. The pin would then be reinserted in these newly aligned openings at which time the spring clip and the crank arm will be locked in this preferred position. A smaller adjustment could be made by realigning the hole 42 with, for example, the opening 28. This adjustment would decrease the torsional prestress by a slight amount. This combined locking and adjustment means provides a simple and inexpensive mode of adjustment in either small or large increments, as desired.

When it is desired that extremely heavy vehicles be supported by the above described type of torsion suspension, it may be advantageous to modify slightly the design of the device to provide greater lateral rigidity. This is most readily accomplished by a wider spacing of the journal bearings and by providing further, a four wheel rather than a two wheel construction, such as was hereinbefore described. This modified embodiment is illustrated in Figures 6, 7 and 8. A pair of journal brackets 50 is utilized having vehicle supporting surfaces 52 and depending arms 54, but having only inboard bearing means 56 rather than inboard and outboard bearing means, as in the first described embodiment. A pair of spring support clips 26 is pivotally mounted on the bearing 56 and operatively engages a bridging torsion spring 38, as heretofore described. In this embodiment, however, the crank arms, generally indicated 60, are not supported by the spring clips but rather are mounted on a pair of axially aligned sleeves 58. It should be understood that each crank arm is mounted on a separate independent sleeve. The sleeves 58 surround the spring 38 and the spring clips 26, and are adjustably secured to the spring clips in the same manner as are the crank arms in the first described embodiment of the invention. The innermost ends of the aligned sleeves are immediately adjacent each other but slightly separated, as at 61, so that they will be free to pivot independently of each other. An additional vehicle supporting member 66 is provided. The lower portion of this member is provided with two arms 68, which form a semicircle embracing the sleeves 58. The support member is maintained in the desired position by means of a semicircular strap 70, which is attached through the flanges 68 to the support member by any desired means, such as cap screw 72. To provide for free pivotal movement of the sleeves relative to the support member 66 bearing means 74 are provided, as best seen in Figure 6. The member 66 and the strap 70 are supported partially by each of the sleeves thereby providing a sturdy assembly in the form of a cylinder completely surrounding the torsion spring 38. Each crank arm 60 is provided with a long leg 62 and a shorter leg 64, each of which carries a wheel supporting spindle 24. The length of the legs is such that each lateral pair of wheel spindles will be aligned radially of the center line of the torsion spring. This is best illustrated in Figure 7.

In this embodiment of the invention, the load on the wheels will urge the crank arms pivotally upward in opposed directions. This opposed force and motion will be transmitted through the associated sleeves and the associated spring clips, and will be counteracted and absorbed in the torsion spring 38. It is thus seen that once again vertical motion only will be transmitted through the brackets 50 into the body of the vehicle.

I claim:

1. In a torsion spring suspension for vehicles, a vehicle support structure having depending arms, axially aligned bearing means carried by said arms, spring clips pivotally mounted on said bearing means, each of said clips having a pair of oppositely facing abutments extending inwardly therefrom and angularly displaced from each other at least about 90 degrees, a spring between said clips in engagement with said abutments, each of said spring clips having associated therewith a crank arm, said crank arms extending in opposite directions for opposed pivotal movement with a load is placed on the vehicle, a plurality of pins within aligned holes of each clip and its associated crank arm to anchor them in a fixed position relative to each other, the longitudinal axes of said pins being approximately radial to the rotational axes of the related clips, an annular recess in each clip radially inwardly of the related pins to receive the latter upon the removal thereof.

2. In a torsion spring suspension for vehicles, a vehicle support structure adapted to support the vehicle and having depending portions each forming inboard and outboard bearing means, crank arms clevised on the depending portions of said support structure and having inward and outward arms, the outward arms being supported by said outboard bearing means, the inward arms having openings therethrough concentric with said inboard bearing means, said crank arms extending one forwardly and one rearwardly of said support structure for opposed rotative motion, a wheel support spindle carried by each crank arm, spring clips rotatably carried on the inboard bearing means of the respective portions, said clips being received within the openings of respective crank arms for rotation therewith, a plurality of pins received within complementary openings of each clip and its related arm, said pins being disposed with their longitudinal axes extending toward the rotational axes of the related clips and being movable toward the last-mentioned axes to permit angular adjustment of said clips relative to said crank arms, recesses in respective clips to receive related pins upon removal thereof, clip extensions projecting inwardly from said clips, and a spring between said crank arms, the terminals of said spring being supported by said extensions and being adapted to resist the rotative motion of said crank arms.

3. A torsion spring suspension for vehicles comprising a vehicle support structure adapted to support a vehicle, a pair of crank arms pivotally mounted on said structure and extending in opposite directions therefrom, a wheel supporting spindle carried by each crank arm, spring clips secured to said crank arms for pivotal movement therewith, oppositely facing abutments integral with each clip angularly displaced from each other approximately 90 degrees and projecting inwardly of said arms, a spring disposed between said clips with the terminals of the spring supported and operatively engaged by the abutments of respective clips to resist pivotal movement of said crank arms when a load is placed on the vehicle, and means to secure said clips to said arms comprising pins mutually engaging peripheral portions of said clips and said arms, said pins having their longitudinal axes extending approximately radial to the rotational axes of the related clips and being removable to permit angular adjustment of said clips relative to said arms.

4. A torsion spring suspension for vehicles comprising vehicle support means spaced from each other adjacent opposite sides of the vehicle, crank arms pivotally mounted on said supports and extending in opposite directions, a wheel spindle mounted on each crank arm, spring mountings secured to said crank arms for pivotal movement therewith, oppositely facing spaced abutments extending from each mounting, and a spring disposed between said mountings in operative engagement with said abutments to resist relative pivotal movement of said crank arms.

5. A torsion spring suspension for vehicles comprising vehicle support means spaced from each other adjacent opposite sides of the vehicle, crank arms mounted on said support means for opposed pivotal rotation when a load is placed on the vehicle, a wheel spindle mounted on each crank arm, spring clips each having oppositely facing spaced abutments, said clips being adjustably secured to respective crank arms for pivotal movement therewith, a torsion spring bridging said crank arms to resist relative pivotal rotion of said arms, each end convolution of said spring being supported by the abutments of one clip.

6. A torsion spring suspension comprising vehicle support means having spaced journal means, crank arms journalled on respective journal means, spring clips rotatably mounted on respective crank arms for rotational movement relative thereto, readily releaseable means anchoring each clip to the related arm, and a torsion spring disposed between and engaged with respective clips.

7. A crank arm attachment for a torsion spring suspended vehicle comprising journal brackets, vehicle supporting means having depending arms at opposite sides of the vehicle, axially aligned journal portions on each arm disposed one inboardly and one outboardly of said arm, a crank arm having a portion thereof in the form of a clevis embracing said arm, the outboard section of the clevis being journaled on said outboard portion of the journal, the inboard section of the clevis having an opening therein larger than and concentric with said inboard journal portion, a spring clip journaled on said inboard portion and disposed within said opening, and means to retain said clip within said opening.

8. A crank arm attachment according to claim 7, wherein the last-mentioned means comprises pins extending radially through radially aligned apertures of said crank arm and said clip to maintain the assembled relationship therebetween.

9. A torsion spring suspension for vehicles comprising vehicle support means having inboard and outboard journal portions integral therewith, crank arms journaled on respective outboard journal portions and having openings larger than and concentric with respective inboard journal portions, a torsion spring disposed between and having its terminals positioned adjacent said inboard journal portions, and means disposed within said openings and journaled on said inboard journal portions to operatively engage and support said spring.

10. In a torsion spring suspension for vehicles, a pair of spaced brackets adapted to support a related vehicle, said brackets each having a depending arm provided with an inboardly extending journal portion, circular spring clips mounted on said journal portions, each of respective clips having a pair of inboardly projecting oppositely facing abutments displaced angularly approximately 90 degrees from each other, a torsion spring disposed between said clips with the terminals thereof engaging and being supported by said abutments, the respective spring having a diameter smaller than the diameter of said clips, a pair of aligned sleeves surrounding said spring, said sleeves having their outwardly extending ends secured to the respective clips and their inwardly extending ends positioned immediately adjacent each other, a third supporting bracket journaled on the adjacent ends of said sleeves, and crank arms secured to the respective sleeves and extending in opposite directions from each other.

11. In a torsion spring suspension for a vehicle, a pair of spaced vehicle support brackets each having a journal portion integral therewith, spring clips mounted on respective journal portions for relative pivotal movement therewith, a torsion spring disposed between said clips with the terminals thereof being engaged and supported by said clips, a pair of sleeves surrounding said spring, the outward ends of said sleeves being secured to said clips, a third vehicle supporting bracket journaled on the inward ends of said sleeves for relative pivotal movement therewith, and crank arms secured to respective sleeves and extending in opposite directions therefrom.

12. In a torsion spring suspension for vehicles, a pair of spaced brackets adapted to support a vehicle and having flanges depending therefrom, spring clips journaled on respective flanges for relative pivotal movement therewith, sleeves secured to respective spring clips for movement therewith, said sleeves together forming a substantially closed cylinder, an intermediate bracket journaled on adjacent ends of said sleeves, crank arms rigidly secured to respective sleeves and extending in opposite directions therefrom, and a torsion spring disposed inside said sleeves and operatively engaged by said clips.

13. In a torsion spring suspension for vehicles, vehicle support brackets, spring mountings journaled on respective brackets for pivotal movement therewith, a pair of sleeves secured at their respective outer ends to said mountings and having their respective inner ends adjacent each other, wheel spindle supporting crank arms secured to respective sleeves for pivotal movement therewith, said arms extending in opposite directions from said sleeves, and a torsion spring operatively engageable with said mountings to resist relative pivotal movement of said crank arms when a load is placed on the vehicle.

14. A torsion spring suspension comprising vehicle support means having journal means, a crank arm member, a spring clip member, one of said arm and clip members being journalled on said journal means, and the other of said arm and clip members being journalled on said one of said members, openings through said members extending toward said journal means, the angular spacing of said openings being such that when predetermined increments of relative rotational movements occur between the arm member and the clip member, certain of the arm member openings will be aligned with certain of the clip member openings, a pin removably disposed in certain of said aligned openings to releasably interlock said members against relative rotational movement, and spring means anchored to the clip member for yieldingly resisting rotation of said one member on said journal means under load of said vehicle support means.

15. A torsion spring suspension comprising vehicle support means having spaced journal means, spring clips journalled on respective journal means, crank arms journalled on respective clips for rotational movement relative thereto, a pin snugly fitted in aligned openings of each arm and its related clip, a torsion spring anchored to said clips, and a recess in each clip to receive the related pin when the latter is driven from the related openings.

16. A torsion spring suspension comprising vehicle support means having journal means, a crank arm member, a spring clip member, one of said arm and clip members being journalled on said journal means, the other of said arm and clip members being journalled on said one of said members, readily releasable means to maintain said other member on said one member, said releasable means comprising openings through said members extending towards said journal means, a pin removably disposed in said aligned openings to releasably interlock said members against relative rotational movement, an annular recess in said one member radially inwardly of the related pin to receive the latter upon the removal thereof, and spring means anchored to the clip member for yieldably resisting rotation of said one member on said journal means under load of said vehicle support means.

17. Torsion adjusting means for a torsion spring suspension comprising a bracket having outboard and inboard journal portions thereon, a clevised crank arm pivotally mounted on said outboard journal portion and having an opening therethrough larger than and disposed concentrically with said inboard journal portion, a torsion spring, a spring support mounted on said inboard journal portion and received within said opening in engagement with said spring, said arm and said spring support having a plurality of radially aligned holes spaced angularly in such a manner that with predetermined increments of relative rotation of said arm and said spring support the holes in the arm will be aligned with certain of the holes in said spring support, and a pin disposed within one of said aligned holes to prevent angular movement of said arm relative to said spring support the longitudinal axis of the pin being disposed to extend in a direction normal to the longitudinal axis of the journal portions.

18. An adjustable torsion spring mounting comprising spaced brackets having axially aligned inboard journal means thereon, spring clips pivotally mounted on said journal means, said clips having a plurality of radially disposed openings in the periphery thereof, a torsion spring operatively supported by and engaging said spring clips, crank arms mounted on respective spring clips for pivotal movement therewith, said arms having a plurality of radially disposed openings at least one of which communicates with one of the first mentioned openings, at least one pin disposed partially in each of the communicating openings with its longitudinal axis disposed to extend radially outward from the longitudinally axis of the journal means, and an annular recess in each clip radially inwardly of the related pin to receive the latter upon removal thereof.

19. A torsion spring mounting comprising spaced brackets having axially aligned journal means, spring supports pivotally mounted on said journal means, a torsion spring operatively engaging said supports, opposed spindle bearing crank arms adjustably mounted on said supports, and means extending radially outward from the rotational axis of the journal means and operable to lock said arms in the desired position relative to said supports.

References Cited in the file of this patent

UNITED STATES PATENTS

| 2,510,644 | McCormick | June 6, 1950 |

FOREIGN PATENTS

| 186,340 | Great Britain | Dec. 20, 1923 |
| 209,879 | Great Britain | Jan. 24, 1924 |
| 484,648 | Great Britain | May 9, 1938 |